United States Patent
Li et al.

(10) Patent No.: US 10,887,160 B2
(45) Date of Patent: Jan. 5, 2021

(54) MANAGEMENT METHOD FOR HOME NETWORK DEVICE AND NETWORK MANAGEMENT SYSTEM

(71) Applicant: ZTE Corporation, Shenzhen (CN)

(72) Inventors: Mingsheng Li, Shenzhen (CN); Yuanjiong Diao, Shenzhen (CN); Xiaojun Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 561 days.

(21) Appl. No.: 15/547,213

(22) PCT Filed: Jan. 18, 2016

(86) PCT No.: PCT/CN2016/071213
§ 371 (c)(1),
(2) Date: Jul. 28, 2017

(87) PCT Pub. No.: WO2016/119607
PCT Pub. Date: Aug. 4, 2016

(65) Prior Publication Data
US 2018/0013615 A1 Jan. 11, 2018

(30) Foreign Application Priority Data
Jan. 30, 2015 (CN) .......................... 2015 1 0054884

(51) Int. Cl.
*G06F 15/173* (2006.01)
*H04L 12/24* (2006.01)
*H04L 12/28* (2006.01)

(52) U.S. Cl.
CPC .............. *H04L 41/08* (2013.01); *H04L 12/28* (2013.01); *H04L 12/283* (2013.01);
(Continued)

(58) Field of Classification Search
CPC ..... H04L 41/08; H04L 12/28; H04L 12/2818; H04L 12/283; H04L 41/046; H04L 41/12; H04L 41/14
(Continued)

(56) References Cited

U.S. PATENT DOCUMENTS 8,473,325 B2 *  6/2013  Barnhill, Jr. ........ H04L 12/2809
                                                  705/7.29
2012/0137002 A1   5/2012  Ferris
(Continued)

FOREIGN PATENT DOCUMENTS

CN    102638460 A    8/2012
CN    104301320 A    1/2015

OTHER PUBLICATIONS

N. Dickey, D. Banks and S. Sukittanon, "Home automation using Cloud Network and mobile devices," 2012 Proceedings of IEEE Southeastcon, Orlando, FL, 2012, pp. 1-4, (Year: 2012).*
(Continued)

*Primary Examiner* — Taylor A Elfervig
(74) *Attorney, Agent, or Firm* — Cantor Colburn LLP

(57) ABSTRACT

The present disclosure, relating to the technical field of communications, provides a management method for a home network device and a network management system. The method includes that: a home gateway acquires home terminal device information in a home network; the home gateway sends the home terminal device information to a home sub-cloud which corresponds to the home network and is independent from other home sub-clouds on a cloud management platform to store.

17 Claims, 4 Drawing Sheets

(52) U.S. Cl.
CPC ........ *H04L 12/2818* (2013.01); *H04L 41/046* (2013.01); *H04L 41/12* (2013.01); *H04L 41/14* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 2012/0166538 | A1* | 6/2012 | Son | H04L 67/02 709/204 |
| 2012/0166992 | A1 | 6/2012 | Huynh | |
| 2012/0179802 | A1 | 7/2012 | Narasimhan | |
| 2013/0159490 | A1 | 6/2013 | Huh | |
| 2013/0212214 | A1* | 8/2013 | Lawson | G06Q 10/06315 709/217 |
| 2013/0290548 | A1* | 10/2013 | He | H04L 69/16 709/228 |
| 2014/0337429 | A1* | 11/2014 | Asenjo | H04L 65/403 709/204 |
| 2017/0093623 | A1* | 3/2017 | Zheng | H04L 63/0892 |

OTHER PUBLICATIONS

L. Kau, B. Dai, C. Chen and S. Chen, "A cloud network-based power management technology for smart home systems," 2012 IEEE International Conference on Systems, Man, and Cybernetics (SMC), Seoul, 2012, pp. 2527-2532 (Year: 2012).*

S. Takatori, S. Matsumoto, S. Saiki and M. Nakamura, "A proposal of cloud-based home network system for multi-vendor services," 15th IEEE/ACIS International Conference on Software Engineering, Artificial Intelligence, Networking and Parallel/Distributed Computing (SNPD), Las Vegas, NV, 2014, pp. 1-6 (Year: 2014).*

K. Suzuki and M. Inoue, "Home network with cloud computing for Home Management," 2011 IEEE 15th International Symposium on Consumer Electronics (ISCE), Singapore, 2011, pp. 421-425 (Year: 2011).*

Y. Yang, Z. Wei, D. Jia, Y. Cong and R. Shan, "A Cloud Architecture Based on Smart Home," 2010 Second International Workshop on Education Technology and Computer Science, Wuhan, 2010, pp. 440-443 (Year: 2010).*

Z. Wei, J. Li, Y. Yang and D. Jia, "A residential gateway architecture based on Cloud computing," 2010 IEEE International Conference on Software Engineering and Service Sciences, Beijing, 2010, pp. 245-248 (Year: 2010).*

K. Suzuki and M. Inoue, "Home network system with cloud computing and distributed autonomous control," 2012 IEEE 16th International Symposium on Consumer Electronics, Harrisburg, PA, 2012, pp. 1-6 (Year: 2012).*

T. Cruz, P. Simões, N. Reis, E. Monteiro, F. Bastos and A. Laranjeira, "An architecture for virtualized home gateways," 2013 IFIP/IEEE International Symposium on Integrated Network Management (IM 2013), Ghent, 2013, pp. 520-526 (Year: 2013).*

International Search Report for corresponding application PCT/CN2016/071213 filed on Jan. 18, 2016; dated Apr. 11, 2016.

European Search Report for corresponding application EP16742669; Report dated Oct. 23, 2017.

* cited by examiner

MANAGEMENT METHOD FOR HOME NETWORK DEVICE AND NETWORK MANAGEMENT SYSTEM

TECHNICAL FIELD

The present disclosure relates to the technical field of communications, and in particular to a management method for a home network device and a network management system.

BACKGROUND

In a traditional transmission network, it is usually difficult for a network management system to implement unified end-to-end management of at least one network device. And the network management system manages a side of a User Network Interface (UNI) and a home gateway. Especially for at least one Customer Premise Equipment (CPE) under the home gateway, the network management system often cannot identify and manage the at least one CPE. In a next generation network, an intelligent home network will occupy a significant position, and a large number of smart homes and home sensing devices, such as intelligent appliances, intelligent safeguard systems, and intelligent light control, will be applied. At the same time, because the intelligent home network has a lot of devices, complex network scenarios, and higher requirements on customization and personalization, a large number of intelligent home network devices will generate huge volumes of home network data, which poses a huge challenge to network architecture and network device management.

Moreover, professional operation and maintenance staffs and users of network and service providers (e.g. operators, servicers and Internet enterprises) cannot perform remote real-time monitoring to states of related home network system devices to implement a response to real-time performance and effectiveness. At the same time, from an operation and maintenance perspective, the operators hope to perform big data statistics and analysis to some behaviors, such as consumption habits, hobbies and interests, and traffic control, of the users, perform further mining of user data resources, and provide more targeted and personalized design and customization.

SUMMARY

A technical problem to be solved by at least some embodiments of present disclosure is to provide a management method for a home network device and a network management system, which can partially solve a problem in the related art that a network management system cannot manage all home terminal devices in a home network as a whole.

To solve the above technical problem, an embodiment of the present disclosure provides a management method for a home network device, which includes that:

acquiring, by a home gateway, home terminal device information in a home network; and sending, by the home gateway, the home terminal device information to a home sub-cloud which corresponds to the home network and is independent from other home sub-clouds on a cloud management platform to store.

In one embodiment, the home terminal device information includes: home terminal device state information, wherein the home terminal device information is stored in the home sub-cloud, so that an operation and maintenance/user terminal performs operation/control to at least one home terminal device in the home network according to the home terminal device information stored in the home sub-cloud.

In one embodiment, the home terminal device information includes: the home terminal device state information, information about control/operation that a user performs to the home terminal device, and information about control/operation that a maintenance/user terminal performs to the home terminal device, wherein the home terminal device information is stored in the home sub-cloud, so that the cloud management platform performs monitoring/management to the home terminal device in the home network according to the home terminal device information stored in the home sub-cloud.

In one embodiment, before acquiring, by the home gateway, the home terminal device information in the home network, including: sending, by the home gateway, the home terminal device information in the home network to the home sub-cloud which corresponds to the home network and is independent from other home sub-clouds through a predetermined cloud management protocol interface, wherein the home sub-cloud performs register and link establishment to at least one home terminal device, performs file configuration to the at least one home terminal device, performs monitoring to a link state between home terminal devices and send at least one configuration file to a corresponding home terminal device through the home gateway.

In one embodiment, the home gateway performs information interaction with at least one home terminal device in the home network through an IP protocol or an intermediate application plug-in application (APP) mode.

In one embodiment, sending, by the home gateway, the home terminal device information to the home sub-cloud which corresponds to the home network and is independent from other home sub-clouds on the cloud management platform to store includes: sending, by the home gateway, the home terminal device information to the home sub-cloud which corresponds to the home network and is independent from other home sub-clouds on the cloud management platform through a communication channel device.

In one embodiment, the communication channel device includes: a physical/virtual Optical Line Terminal (OLT) and an Optical Distribution Network (ODN).

In one embodiment, the communication channel device includes: a physical/virtual Optical Line Terminal (OLT), an Optical Distribution Network (ODN), and a physical/virtual Multiple Dwelling Unit (MDU)/Distributed Processing Unit (DPU).

In one embodiment, the cloud management platform further includes: a channel cloud which is used for storing and managing device information of the communication channel device, wherein the device information at least includes state information, configuration information, topology information and route information of the communication channel device.

In one embodiment, the cloud management platform further includes: a service cloud, which is used for storing and managing at least one service application of at least one home terminal device in the home network.

To solve the above technical problem, an embodiment of the present disclosure also provides a management method for a home network device, which includes that:

acquiring, by a cloud management platform, home terminal device information in a home network from a home sub-cloud, wherein the home terminal device information is acquired by the home sub-cloud from a home gateway of the home network; performing, by the cloud management platform, monitoring/management to at least one home terminal device in the home network according to the home terminal device information.

In one embodiment, acquiring, by the cloud management platform, the home terminal device information in the home network from the home sub-cloud includes: acquiring, by the cloud management platform, home terminal device state information in the home network, information about control/operation that a user performs to the home terminal device, and information about control/operation that an operation and maintenance/user terminal performs to the home terminal device from the home sub-cloud.

In one embodiment, performing, by the cloud management platform, monitoring/management to the at least one home terminal device in the home network according to the home terminal device information includes: performing, by the cloud management platform, monitoring/management to the home terminal device in the home network according to the home terminal device state information, the information about control/operation that the user performs to the home terminal device, and the information about control/operation that the operation and maintenance/user terminal performs to the at least one home terminal device.

To solve the above technical problem, an embodiment of the present disclosure also provides a management method for a home network device, which includes that:

acquiring, by an operation and maintenance/user terminal, home terminal device information in a home network from a home sub-cloud, wherein the home terminal device information is acquired by the home sub-cloud from a home gateway of the home network; performing, by the operation and maintenance/user terminal, operation/control to at least one home terminal device in the home network according to the home terminal device information.

In one embodiment, acquiring, by the operation and maintenance/user terminal, the home terminal device information in the home network from the home sub-cloud includes: acquiring, by the operation and maintenance/user terminal, home terminal device state information in the home network from the home sub-cloud.

In one embodiment, the operation and maintenance/user terminal performs information interaction with the home sub-cloud through an intermediate application plug-in application (APP) mode.

In one embodiment, performing, by the operation and maintenance/user terminal, operation/control to the at least one home terminal device in the home network according to the home terminal device information includes: performing, by the operation and maintenance/user terminal, operation/control to the home terminal device in the home network according to the home terminal device state information.

To solve the above technical problem, an embodiment of the present disclosure also provides a network management system, which includes:

a home network including a home gateway, wherein the home gateway is arranged to acquire home terminal device information in the home network, and send the home terminal device information to a home sub-cloud which corresponds to the home network and is independent from other home sub-clouds on a cloud management platform to store; a cloud management platform to acquire the home terminal device information in the home network from the home sub-cloud, and perform monitoring/management to at least one home terminal device in the home network according to the home terminal device information.

In one embodiment, the network management system further includes: an operation and maintenance/user terminal to acquire the home terminal device information in the home network from the home sub-cloud and perform operation/control to the at least one home terminal device in the home network according to the home terminal device information.

In one embodiment, the home gateway performs information interaction with the home sub-cloud through intermediate application plug-in application (APP).

In one embodiment, a predetermined cloud computing network interface protocol is adopted as an interface protocol between the home gateway and the home sub-cloud.

In one embodiment, the operation and maintenance/user terminal performs information interaction with the at least one home terminal device in the home network through the home gateway.

In one embodiment, the operation and maintenance/user terminal performs information interaction with the home gateway through APP.

The above technical solution of the present disclosure has the following beneficial effects:

by sending the home terminal device information in the home network to the home sub-cloud to store, making a management terminal perform operation/control and monitoring to the at least one home terminal device through the home sub-cloud, and performing cloud management to the at least one home terminal device, the solution of the present disclosure implements unified management to all home terminal devices in the home network.

DETAILED DESCRIPTION

For making a technical problem to be solved, a technical solution and advantages of the present disclosure more clear, the present disclosure is elaborated below in combination with the accompanying drawings and specific embodiments.

First, a system architecture of a network management system of the present disclosure is elaborated.

A whole system architecture can be either a physical network architecture or a virtual network architecture. The system architecture can also be a Software Defined Network (SDN) architecture. The system architecture of the network management system of the present disclosure is elaborated below in combination with the accompanying drawings and specific embodiments.

Figure 1:
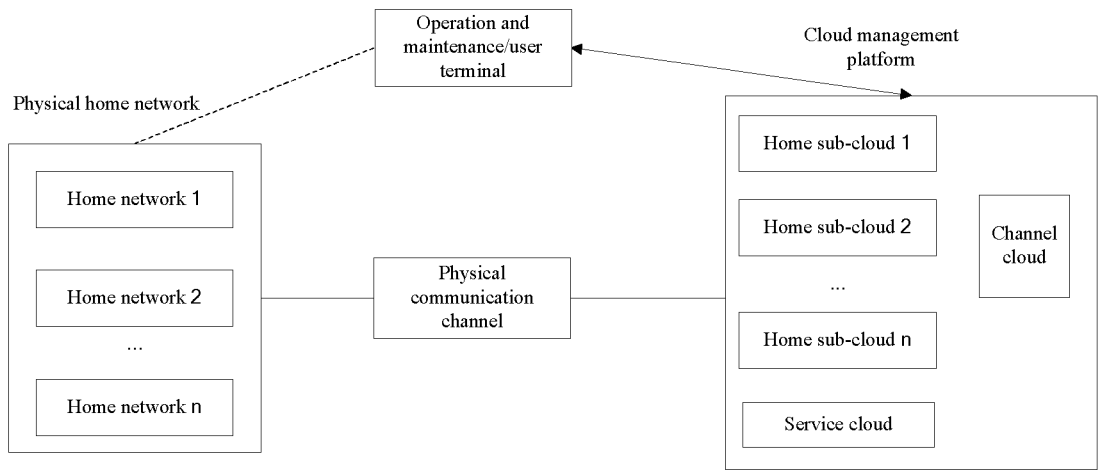
FIG. 1 is a structural schematic diagram of a network management system of the present disclosure under a physical network architecture.
Figure 2:
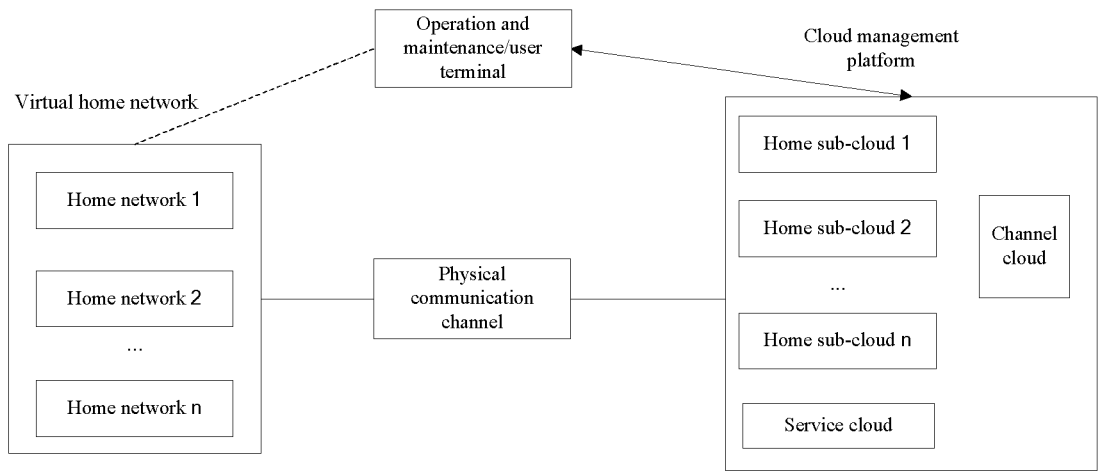
FIG. 2 is a structural schematic diagram of a network management system of the present disclosure under a virtual network architecture.

The system architecture includes a home network, a communication channel device, a management cloud, a cloud management platform and an operation and maintenance/user terminal. With reference to FIG. 1, under the physical network architecture, the system architecture includes: a physical home network, a physical communication channel device, a cloud management platform and an operation and maintenance/user terminal. With reference to FIG. 2, under the virtual network architecture, the system architecture includes: a virtual home network, a virtual communication channel device, a cloud management platform and an operation and maintenance/user terminal.

Figure 3:
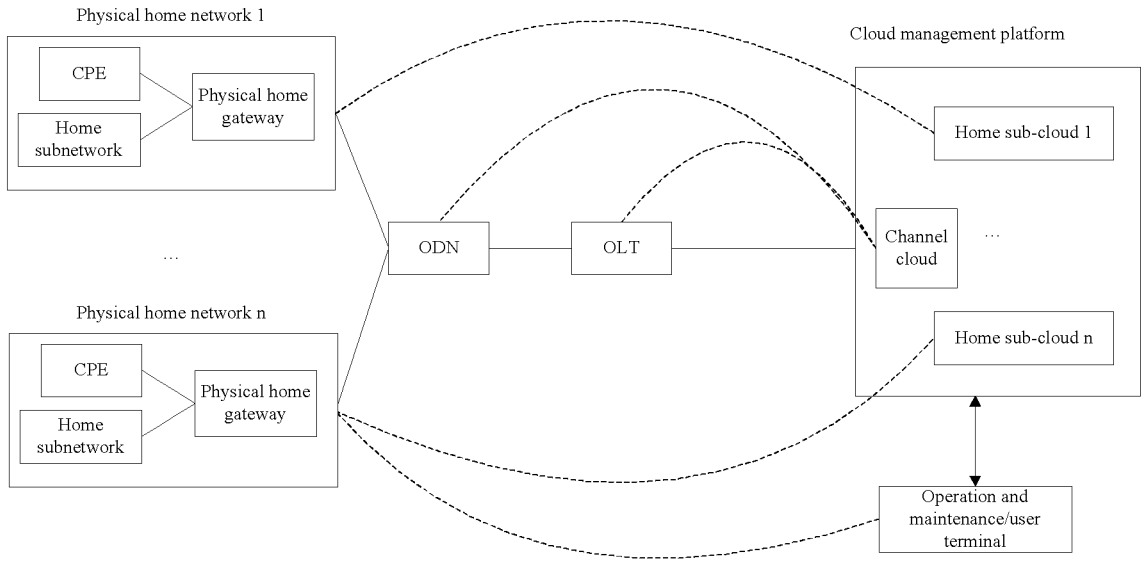
FIG. 3 is a structural schematic diagram of a physical home network and a physical communication channel device in a network management system of the present disclosure under a physical network architecture.
Figure 4:
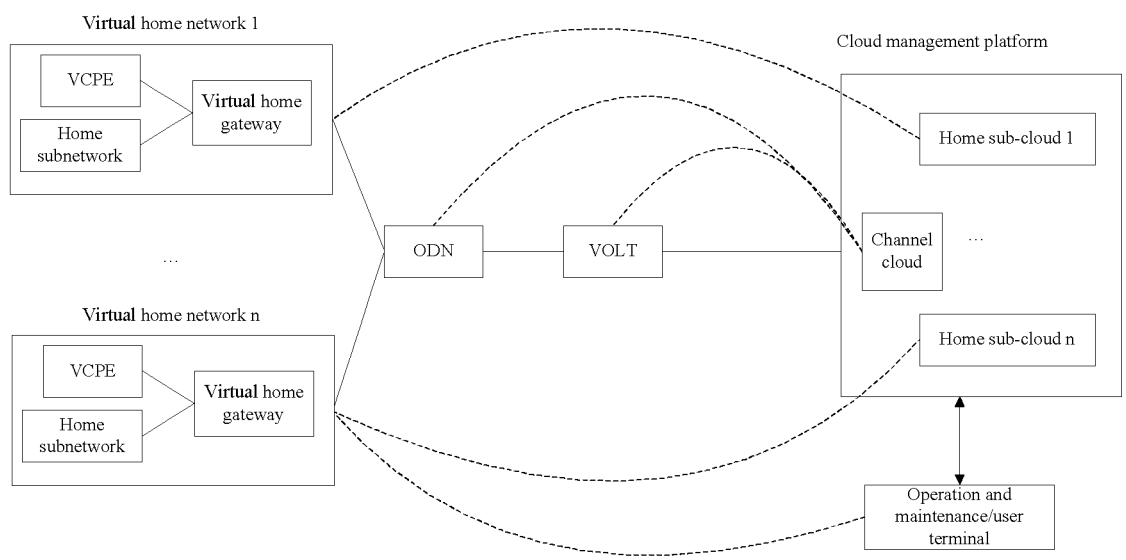
FIG. 4 is a structural schematic diagram of a virtual home network and a virtual communication channel device in a network management system of the present disclosure under a virtual network architecture.

With reference to FIG. 3 and FIG. 4, the home network includes: a physical home gateway (a virtual home gateway), a physical CPE (a Virtual CPE (VCPE)), and a smart home subnetwork (or a home subnetwork), completing service and operation and maintenance of a whole smart home; both the CPE and the VCPE belong to home terminal devices (the home terminal devices also include a network peripheral device included in a home subnetwork of the home network). Each home network (whether the physical home network or the virtual home network) corresponds to an unique home sub-cloud, which belongs to the cloud management platform and is independent from other home sub-clouds. The home sub-cloud, as an individual permission management domain, mainly takes charge of storing and managing home terminal device state information of a home network. These state information includes: user permission information of at least one home terminal device, opening information of the at least one home terminal device, configuration file information of the at least one home terminal device, topology information of the at least one home terminal device, fault alarm information of the at least one home terminal device, link state information between the home terminal devices, and so on. Moreover, the home sub-cloud provides APP and a maintenance and service interface, so that the operators, the maintenance staffs or the users can monitor user home network and system device state in real time through a mobile terminal.

Figure 5:
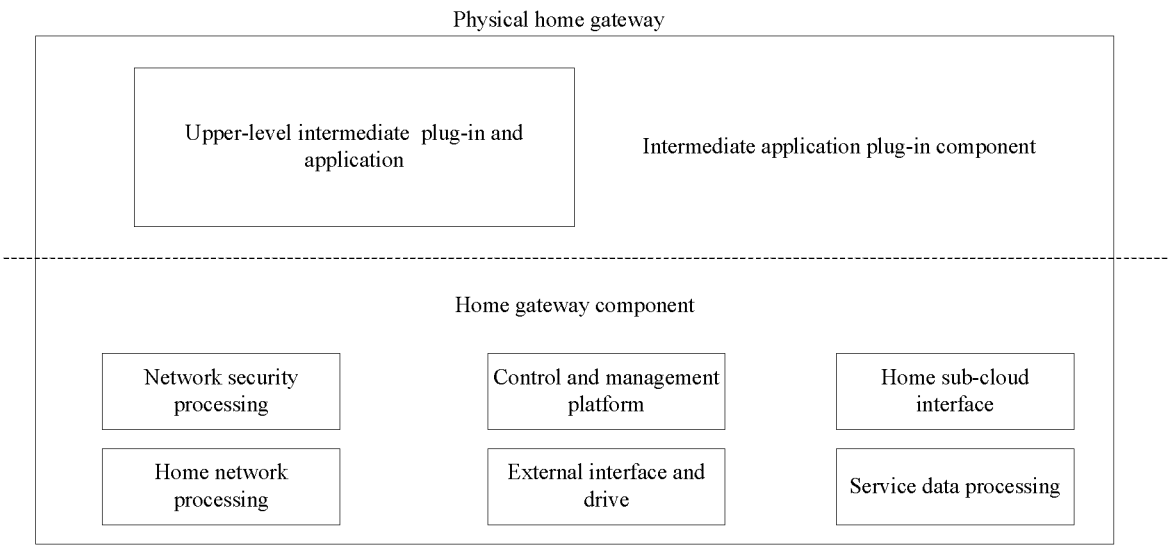
FIG. 5 is a structural schematic diagram of a physical home gateway in a network management system of the present disclosure under a physical network architecture.

FIG. 5 is a typical architecture diagram of a physical home gateway. The physical home gateway includes: a physical home gateway component and an intermediate application plug-in component. The physical home gateway component mainly takes charge of a home gateway function, including a function of gating the home subnetworks (such as a home instrumentation sensing network, an intelligent appliance network, and a home safeguard network) and a Customer Premise Equipment (CPE) device. The home subnetwork is usually connected with the home gateway through a subnetwork gateway, and the subnetwork gateway functions in managing and routing the home subnetwork belonging to the subnetwork gateway. The intermediate application plug-in component provides the physical home gateway with an upper-layer intermediate plug-in and at least one application, thereby implementing communication with systems and devices like intermediate application plug-in of home network sub-cloud and application plug-in of handheld terminal. More specifically, the physical home gateway component includes: a network security processing component, a control and management platform component, a home network sub-cloud interface component, a home network processing component, an external interface and drive component, a service data processing component, and so on. The network security processing component functions in processing network security related to the home network, and includes network security protocols between upstream and downstream network devices and the system, such as authorization, firewall, private network, data encryption and decryption, and Denial of Service (DOS) attack prevention. The control and management platform component, as a Central Processing Unit (CPU) control center of the home gateway, takes charge of system control, mutual communication interface, data exchange, state monitoring and power management of all components, and as an Internet Protocol (IP) management entity, performs management interaction with an upper-layer network and a lower-layer network. The home network sub-cloud interface component, as a specialized and independent home network sub-cloud interface, takes charge of communication between the home network and the home sub-cloud of the cloud management platform, and a cloud interface protocol is adopted as the interface protocol. The home network processing component takes charge of processing service and management between an internal subnetwork of the home network and the CPE, including communications with a sensing subnetwork gateway, a safeguard subnetwork gateway, intelligent appliances, and the CPE device at home. The external interface and drive component mainly takes charge of installing and managing an external hardware interface and drive. The service data processing component mainly takes charge of various service application data, such as Voice over Internet Protocol (VoIP), Internet Protocol television (IPTV), broadband, online game and other services.

Figure 6:
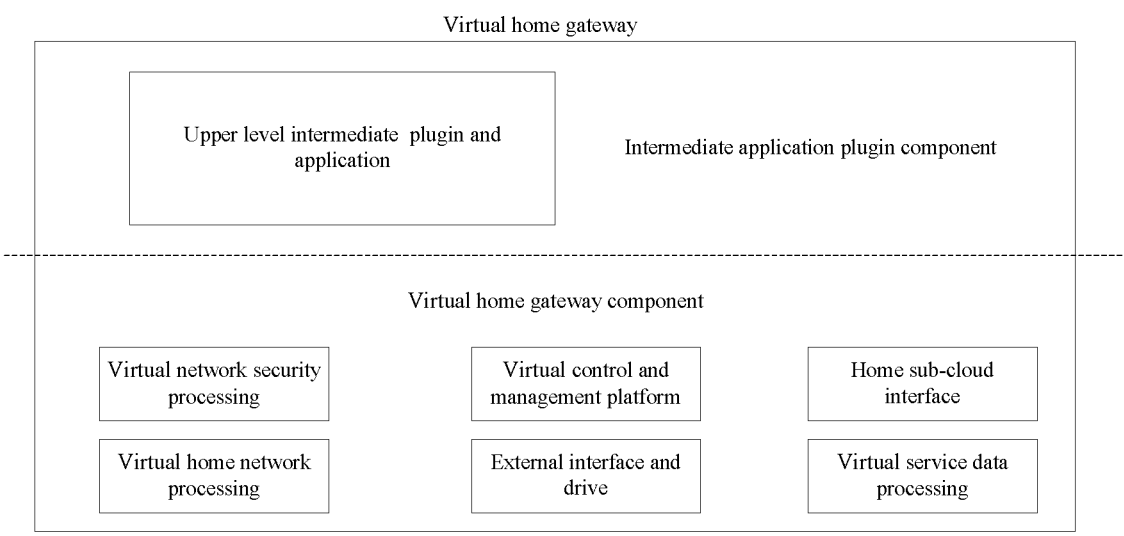
FIG. 6 is a structural schematic diagram of a virtual home gateway in a network management system of the present disclosure under a virtual network architecture.

FIG. 6 is a structural schematic diagram of a virtual home gateway. The virtual home gateway includes a virtual home gateway component and an intermediate application plug-in component. The virtual home gateway component mainly takes charge of a home network gateway function, including a function of gating virtual home subnetworks (such as the home instrumentation sensing network, the intelligent appliance network, and the home safeguard network) and the CPE device. The home subnetwork is usually connected to the virtual home gateway through the subnetwork gateway, and the subnetwork gateway functions in managing and routing the virtual home subnetwork belonging to the the subnetwork gateway. The intermediate application plug-in component provides the virtual home gateway with the upper-layer intermediate plug-in and the application, so as to perform interaction with an upper-layer network, such as register, online and authorization. The functions of the function components of the virtual home gateway are completely consistent with that of the components of the physical home gateway, and the difference is that these function components included are completely or partly virtualized. The typical virtualized components mainly include: a virtual security processing component, a virtual management and control platform component, a virtual home network processing component, and a virtual service data processing component. After all or a part of functions of these function components are virtualized, the function components are moved upwards to a cloud platform or an upper-layer network device (e.g. an Optical Line Terminal (OLT)) to be processed, such as Dynamic Host Configuration Protocol (DHCP) configuration, IP routing, local configuration, firewall, and other functions, thereby simplifying a software architecture, a management mode and an opening flow; such a manner facilitates function simplification and resource saving of the whole network architecture and gateway devices, thereby reducing cost and power consumption of operation and maintenance of the system.

With reference to FIG. 3 and FIG. 4, the communication channel device includes a physical OLT (a Virtual OLT (VOLT)) and an Optical Distribution Network (ODN). If necessary, the communication channel device also includes: a physical MDU/DPU (a Virtual MDU (VMDU)/Virtual DPU (VDPU)), or a switch. The communication channel device is used for providing a transmission channel for materialization, virtualization and flattening.

The cloud management platform mainly takes charge of management and operation and maintenance of the whole network device system, including a channel cloud, a service cloud and many home network sub-clouds.

For the home network sub-cloud as an individual permission management domain, all the management and interaction information related to the home network is stored in the sub-cloud, including the state of all the home terminal devices in the home network, especially the state of various instrumentation sensing subnetwork devices (network peripheral devices) in the smart home network. The home network sub-cloud also provides a data interface. An upper-layer cloud management platform and an external system implements management and operation to the home network device and system by accessing the user home network sub-clouds including the home sub-cloud and the channel cloud. The home sub-cloud is used for storing and managing the home terminal device state information of the home network, and provides upwards the APP application and a maintenance service interface. The channel cloud takes charge of storing and managing the state information of the communication channel devices (such as the OLT, the switch, the router and the ODN), configuration information, topology information and route information. At the same time, the channel cloud communicates with the upper-layer cloud management platform to complete management, monitoring and control to the communication channel device by using a cloud management way.

The service cloud mainly takes charge of various service applications of the home terminal device in the whole home network, such as videos, storage, broadband, voice services, games, online store, and stock investment.

Figure 7:
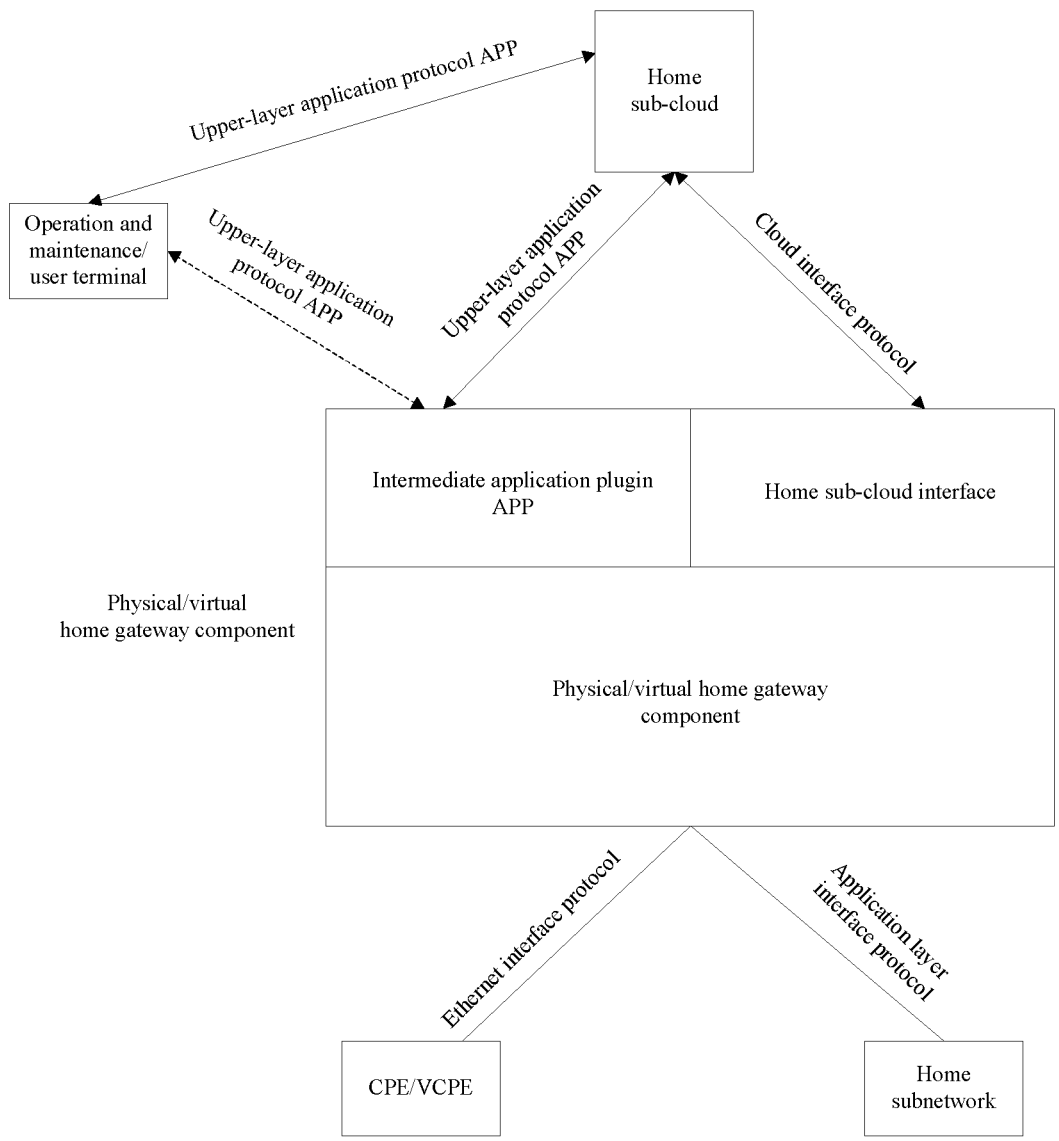
FIG. 7 is a structural schematic diagram of an external interface protocol of a device in a network management system of the present disclosure under a physical/virtual network architecture.

The above is the elaboration of the network management system architecture. Communication protocols and data interaction flows among the devices in the system architecture are elaborated below with reference to FIG. 7.

(1) The communication protocol and data interaction flow between the home gateway and the home subnetwork are elaborated below.

The whole home network implements all-IP management, especially the main gateway routing devices in the home network have network IP addresses, and the devices include the home gateway, sensing subnetwork gateway, a set-top box, the intelligent appliance, and so on. Layer-2 network peripheral devices, a part of which do not have the IP address, like a smoke sensing alarm, perform network topology creation and management through an MAC address or port information of the gateway device. At the same time, the home gateway or the subnetwork gateway performs management as an IP Host function and performs IP address Relay agent according to needs.

The home subnetwork includes an intelligent appliance network, various home instrumentation sensing networks, the home safeguard network and other smart home networks. The network peripheral device in the home subnetwork includes: various home instrumentation sensing networks in the smart home network, such as safeguard, monitoring, appliances, lights and other subsystems and sensing devices. The home gateway performs interaction with the home subnetwork through the IP protocol (or the intermediate application plug-in APP). Specifically, the home gateway and each home subnetwork gateway are managed by using an IP way and a master-slave mode. For example, for a Zigbee sensing subnetwork gateway connected under the smart home network gateway, data can be reported to the home gateway through a certain application layer protocol, and data of the Zigbee sensing subnetwork gateway is encapsulated by using an HTTP protocol. Each home subnetwork gateway is a layer-2 subnetwork gateway belonging to the home gateway, mainly taking charge of managing the peripheral device in the subnetwork, and reporting the network topology information and device state information of the network peripheral device to the home gateway. Users can define and design, according to needs and interests, their own home networks by way of the intermediate application plug-in like APP and the SDN, and can also define and design their own home networks through a third-party (e.g. an operator and a system integrator), thereby flexibly implementing customized and personalized services of a home network client. All the customized network device state and information (including the configured file, the IP address, the MAC address, and so on) is reported to the home gateway in real time. The users can also increase or reduce smart home sensing devices according to needs, for example, define a networking architecture of the home network. And the dynamically created network topology is reported to the home gateway. Certainly, it is feasible to adopt other protocols, for example, an HTML protocol, to perform interaction.

(2) The communication protocol and data interaction flow between the home gateway and the home sub-cloud are elaborated below.

Network-layer data interaction of home network device management information between the home gateway and the home sub-cloud is reporting the home network device management information to the home network sub-cloud through a predetermined cloud management protocol interface (a home sub-cloud interface) of the home gateway. And the interface protocol between the home gateway and the home sub-cloud adopts a certain cloud computing network interface protocol message format, e.g. an OpenFlow protocol. Moreover, information interaction is performed by way of the intermediate application plug-in APP. Certainly, it is feasible to adopt other protocols, for example, a Hypertext Transmission Protocol (HTTP) protocol or a Hypertext Markup Language (HTML) protocol, to perform interaction.

The home gateway reports the home terminal device state information, the topology information, and the operation/control information of the operation and maintenance/user terminal to the home sub-cloud through the home sub-cloud interface, and provides an embedded intermediate application plug-in like APP, so that the home gateway can perform interactive operation with the home sub-cloud and report all system operations and device states in the home network to the home sub-cloud.

(3) The communication protocol and data interaction flow between the home gateway and the operation and maintenance/user terminal are elaborated below.

The communication interaction between the home gateway and the operation and maintenance/user terminal can be performed by using either the way of the intermediate application plug-in APP or other protocols, e.g. the HTTP protocol or the HTML protocol.

(4) The communication protocol and data interaction flow between the home gateway and the at least one home terminal device like the CPE device (mainly including a computer, a telephone and a printer) are elaborated below.

The communication interaction between the home gateway and the CPE device can be performed by using either the way of the intermediate application plug-in APP or a general smart home network protocol, e.g. Universal Plug and Play (UpnP) or Digital Living Network Alliance (DLNA), and WiFi or Bluetooth.

(5) The communication protocol and data interaction flow between the home sub-cloud and the cloud management platform are elaborated below (not shown in the figure).

The communication interaction between the home sub-cloud and the cloud management platform is performed through either the way of APP or other protocols, e.g. the HTTP protocol or the HTML protocol.

(6) The communication protocol and data interaction flow between the cloud management platform and the operation and maintenance/user terminal are elaborated below (not shown in the figure).

The communication interaction between the cloud management platform and the operation and maintenance/user terminal is performed through either the way of APP or other protocols, e.g. the HTTP protocol or the HTML protocol.

(7) The communication protocol and data interaction flow between the home sub-cloud and the operation and maintenance/user terminal are elaborated below.

The communication interaction between the home sub-cloud and the operation and maintenance/user terminal is performed through one of the HTTP protocol, the HTML protocol and the APP.

A management method for a home network device of the present disclosure is described in detail below.

The home gateway sends, through a predetermined cloud management protocol interface, the home terminal device information in the home network to the home sub-cloud which correspond to the home network, so that the home sub-cloud performs register and link establishment to at least one home terminal device, performs file configuration to the at least one home terminal device, performs monitoring to a link state between home terminal devices and send a configuration file to the at least one home terminal device through the home gateway.

If the users define and design, according to needs and interests, their own home networks by way of the intermediate application plug-in like APP and the SDN, the users can also define and design their own home networks through the third-party (e.g. the operator and the system integrator), thereby flexibly implementing customized and personalized services of the home network client. All the customized network device state and information (including the configured file, the IP address, the MAC address, and so on) is reported to the home network sub-cloud through the home gateway in real time, and is stored in the home network sub-cloud. Or the users automatically create a home network topology according to needs, e.g. increasing or reducing smart home sensing devices, and defining the networking architecture of the home network. The dynamically created network topology is reported to and stored in the home network sub-cloud through the home gateway, so as to perform dynamic route listing and topology update, and so on.

When the user home network changes, for example, the user moves to another place or changes the home gateway, or adds or changes the network device, management data, such as personal register information, a device configuration file, an authentication limit and device drive, of the home network is automatically issued from the home sub-cloud of the cloud management platform to the changed network and device, thereby completing opening and registration of a home network service faster and more conveniently, and improving operation and maintenance efficiency and reducing complexity of management.

Furthermore, the user can call, through the APP of a user terminal, home sub-cloud data (the stored home terminal device state information) of the cloud management platform in real time, and check, through a transmission network and the home gateway, working state, network link state, network rate, network topology, power consumption and other data of the whole home terminal device at present. Besides, the terminal held by the user can perform, through the APP, operation and control to the home terminal device of the home network according to the acquired data. Or the user performs operation and control to the home terminal device of the home network according to the acquired data, such as increasing or reducing or opening or closing the network device, and opening a monitoring system, and modifying a user password. Information about operation or control that the user terminal performs to the home terminal device will be reported, through the home gateway, to the home sub-cloud to store, so that the cloud management platform performs, through the home sub-cloud, real-time monitoring and management to all states and operations of the home network.

Furthermore, the cloud management platform interacts with the operation and maintenance terminal through the APP, and provides fault alarm and the link state of the whole network in time, so that the maintenance staff can operate and control and monitor abnormal situations of the network devices and the user terminals through the APP, thereby realizing real-time performance and effectiveness of operation and maintenance on providing networks and services, reducing cost of operation and maintenance, and improving efficiency of operation and maintenance. The cloud management platform can also acquire from the home sub-cloud in real time the home sub-cloud data (such as the home terminal device state information, the information about control/operation that the user performs to the home terminal device, and the information about control/operation that the maintenance/user terminal performs to the home terminal device), and monitor the home terminal device.

Furthermore, from an operator (which can also be regarded as a management terminal) perspective, the operator hopes to perform big data statistics and analysis to some behaviors, such as consumption habits, hobbies and interests, and traffic control, of the users through the home sub-cloud, perform further mining of user data resources, and provide more targeted and personalized design and customization.

Furthermore, the home network architecture of the network management system in the present disclosure satisfies different application scenarios by using a virtual network and SDN network architecture. At the same time, the home subnetwork may include the subnetwork gateway, may also not include the subnetwork gateway. The home subnetwork may also be a layer-2 network or a wireless mesh network MESH.

Furthermore, the home gateway component (the virtual home gateway component) may include a part of function components, or a wireless network interface component is added.

Furthermore, the terminal device of the home network architecture of the network management system can be a home network gateway device or the ONT, or even moves to become the MDU or the DPU of an access end. On management, each ONT or access end device corresponds to a sub-cloud by analogy, each home network corresponds to a home subnetwork by analogy, each home gateway corresponds to a home subnetwork gateway by analogy.

To sum up, by sending the home terminal device information in the home network to the home sub-cloud to store, making a management terminal perform operation/control and monitoring to the home terminal device through the home sub-cloud, and performing cloud management to at least one home terminal device, the solution of the present disclosure implements unified management to all home terminal devices in the home network.

Through the solution of the present disclosure, professional operation and maintenance staffs and users of network and service providers (e.g. operators, servicers and Internet enterprises) can perform remote real-time monitoring to states of related home network system devices to implement a response to real-time performance and effectiveness. At the same time, from an operation and maintenance perspective, the operators perform big data statistics and analysis to some behaviors, such as consumption habits, hobbies and interests, and traffic control, of the users, perform further mining of user data resources, and provide more targeted and personalized design and customization.

The solution of the present disclosure implements personalized design of the user. For example, the user needs to perform Do it Yourself (DIY) deployment to the home network, and needs to flexibly add a third-party instrumentation sensing solution.

The above are exemplary embodiments the present disclosure. It should be indicated that, on the premise of not departing from the principles of the present disclosure, those ordinary skill in the art may also make a number of improvements and supplements, and these improvements and supplements should fall within the scope of the claims of the present disclosure.

INDUSTRIAL APPLICABILITY

By sending the home terminal device information in the home network to the home sub-cloud to store, making a management terminal perform operation/control and monitoring to at least one home terminal device through the home sub-cloud, and performing cloud management to the at least one home terminal device, the solution of the present disclosure implements unified management to all home terminal devices in the home network.

What is claimed is:

1. A management method for a home network device, comprising:
    acquiring, by a home gateway, home terminal device information in a home network; and
    sending, by the home gateway, the home terminal device information to a home sub-cloud which corresponds to the home network and is independent from other home sub-clouds on a cloud management platform to store;
    wherein the cloud management platform comprises a channel cloud, a service cloud and a plurality of home sub-clouds;
    wherein each of the plurality of home sub-clouds is configured to store and manage the home terminal device information of the home network, the service cloud is configured to store and manage service applications of the home terminal device in the home network;
    wherein the channel cloud is used for storing and managing device information of the communication channel device, wherein the device information at least comprises state information, configuration information, topology information and route information of the communication channel device; and
    wherein the home terminal device information comprises: home terminal device state information, topology information, information about control/operation that a user performs to the home terminal device, and information about control/operation that a maintenance/user terminal performs to the home terminal device, wherein the home terminal device information is stored in the home sub-cloud, so that the cloud management platform performs monitoring/management to the home terminal device in the home network according to the home terminal device information stored in the home sub-cloud.

2. The management method as claimed in claim 1, wherein after the acquiring, by the home gateway, the home terminal device information in the home network, the method further comprises:
    sending, by the home gateway, the home terminal device information in the home network to the home sub-cloud which corresponds to the home network and is independent from other home sub-clouds through a predetermined cloud management protocol interface after the home gateway acquires the home terminal device information in the home network, wherein the home sub-cloud performs register and link establishment to at least one home terminal device, performs file configuration to the at least one home terminal device, performs monitoring to a link state between home terminal devices and send at least one configuration file to a corresponding home terminal device through the home gateway.

3. The management method as claimed in claim 1, wherein the home gateway performs information interaction with at least one home terminal device in the home network through an IP protocol or an intermediate plug-in application (APP) mode.

4. The management method as claimed in claim 1, wherein sending, by the home gateway, the home terminal device information to the home sub-cloud which corresponds to the home network and is independent from other home sub-clouds on the cloud management platform to store comprises:
    sending, by the home gateway, the home terminal device information to the home sub-cloud which corresponds to the home network and is independent from other home sub-clouds on the cloud management platform through a communication channel device.

5. The management method as claimed in claim 4, wherein the communication channel device comprises: a physical/virtual Optical Line Terminal (OLT) and an Optical Distribution Network (ODN).

6. The management method as claimed in claim 4, wherein the communication channel device comprises: a physical/virtual Optical Line Terminal (OLT), an Optical Distribution Network (ODN), and a physical/virtual Multiple Dwelling Unit (MDU)/Distributed Processing Unit (DPU).

7. A management method for a home network device, comprising:
    acquiring, by a cloud management platform, home terminal device information in a home network from a home sub-cloud, wherein the home terminal device information is acquired by the home sub-cloud from a home gateway of the home network;

performing, by the cloud management platform, monitoring/management to at least one home terminal device in the home network according to the home terminal device information;

wherein the cloud management platform comprises a channel cloud, a service cloud and a plurality of home sub-clouds;

wherein each of the plurality of home sub-clouds is configured to store and manage the home terminal device information of the home network, the service cloud is configured to store and manage service applications of the home terminal device in the home network;

wherein the channel cloud is used for storing and managing device information of the communication channel device, wherein the device information at least comprises state information, configuration information, topology information and route information of the communication channel device; and wherein the home terminal device information comprises: home terminal device state information, topology information, information about control/operation that a user performs to the home terminal device, and information about control/operation that a maintenance/user terminal performs to the home terminal device, wherein the home terminal device information is stored in the home sub-cloud.

8. The management method as claimed in claim 7, wherein performing, by the cloud management platform, monitoring/management to the at least one home terminal device in the home network according to the home terminal device information comprises:

performing, by the cloud management platform, monitoring/management to the home terminal device in the home network according to the home terminal device state information, the information about control/operation that the user performs to the home terminal device, and the information about control/operation that the operation and maintenance/user terminal performs to the at least one home terminal device.

9. A management method for a home network device, comprising:

acquiring, by an operation and maintenance/user terminal, home terminal device information in a home network from a home sub-cloud, wherein the home terminal device information is acquired by the home sub-cloud from a home gateway of the home network;

performing, by the operation and maintenance/user terminal, operation/control to at least one home terminal device in the home network according to the home terminal device information;

wherein the cloud management platform comprises a channel cloud, a service cloud and a plurality of home sub-clouds;

wherein each of the plurality of home sub-clouds is configured to store and manage the home terminal device information of the home network, the service cloud is configured to store and manage service applications of the home terminal device in the home network;

wherein the channel cloud is used for storing and managing device information of the communication channel device, wherein the device information at least comprises state information, configuration information, topology information and route information of the communication channel device; and wherein the home terminal device information comprises: the home terminal device state information, topology information, information about control/operation that a user performs to the home terminal device, and information about control/operation that a maintenance/user terminal performs to the home terminal device, wherein the home terminal device information is stored in the home sub-cloud.

10. The management method as claimed in claim 9, wherein acquiring, by the operation and maintenance/user terminal, the home terminal device information in the home network from the home sub-cloud comprises:

acquiring, by the operation and maintenance/user terminal, home terminal device state information in the home network from the home sub-cloud or the operation and maintenance/user terminal performs information interaction with the home sub-cloud through an intermediate plug-in application (APP) mode.

11. The management method as claimed in claim 10, wherein performing, by the operation and maintenance/user terminal, operation/control to the at least one home terminal device in the home network according to the home terminal device information comprises:

performing, by the operation and maintenance/user terminal, operation/control to the home terminal device in the home network according to the home terminal device state information.

12. A network management system, comprising:

a home network comprising a home gateway, wherein the home gateway comprises at least one processor and a memory, the home gateway is arranged to acquire home terminal device information in the home network, and send the home terminal device information to a home sub-cloud which corresponds to the home network and is independent from other home sub-clouds on a cloud management platform to store;

a cloud management platform to acquire the home terminal device information in the home network from the home sub-cloud, and perform monitoring/management to at least one home terminal device in the home network according to the home terminal device information;

wherein the cloud management platform comprises a channel cloud, a service cloud and a plurality of home sub-clouds;

wherein each of the plurality of home sub-clouds is configured to store and manage the home terminal device information of the home network, the service cloud is configured to store and manage service applications of the home terminal device in the home network;

wherein the channel cloud is used for storing and managing device information of the communication channel device, wherein the device information at least comprises state information, configuration information, topology information and route information of the communication channel device; and wherein the home terminal device information comprises: home terminal device state information, topology information, information about control/operation that a user performs to the home terminal device, and information about control/operation that a maintenance/user terminal performs to the home terminal device, wherein the home terminal device information is stored in the home sub-cloud, so that the cloud management platform performs monitoring/management to the home terminal device in the home network according to the home terminal device information stored in the home sub-cloud.

13. The network management system as claimed in claim 12, wherein further comprising:
    an operation and maintenance/user terminal to acquire the home terminal device information in the home network from the home sub-cloud and perform operation/control to the at least one home terminal device in the home network according to the home terminal device information:
    or the home gateway performs information interaction with the home sub-cloud through intermediate plug-in application (APP);
    or a predetermined cloud computing network interface protocol is adopted as an interface protocol between the home gateway and the home sub-cloud.

14. The network management system as claimed in claim 13, wherein the operation and maintenance/user terminal performs information interaction with the at least one home terminal device in the home network through the home gateway.

15. The network management system as claimed in claim 14, wherein the operation and maintenance/user terminal performs information interaction with the home gateway through APP.

16. A management device for a home network device, comprising: a home gateway; wherein the home gateway comprises at least one processor and a memory, the home gateway is arranged to acquire home terminal device information in a home network and send the home terminal device information to a home sub-cloud which corresponds to the home network and is independent from other home sub-clouds on a cloud management platform to store;
    wherein the cloud management platform comprises a channel cloud, a service cloud and a plurality of home sub-clouds;
    wherein each of the plurality of home sub-clouds is configured to store and manage the home terminal device information of the home network, the service cloud is configured to store and manage service applications of the home terminal device in the home network;
    wherein the channel cloud is used for storing and managing device information of the communication channel device, wherein the device information at least comprises state information, configuration information, topology information and route information of the communication channel device; and
    wherein the home terminal device information comprises: home terminal device state information, topology information, information about control/operation that a user performs to the home terminal device, and information about control/operation that a maintenance/user terminal performs to the home terminal device, wherein the home terminal device information is stored in the home sub-cloud, so that the cloud management platform performs monitoring/management to the home terminal device in the home network according to the home terminal device information stored in the home sub-cloud.

17. A management device for a home network device, comprising: a cloud management platform, wherein the cloud management platform is arranged to acquire home terminal device information, which is acquired by the home sub-cloud from a home gateway of the home network, in a home network from a home sub-cloud and perform monitoring/management to at least one home terminal device in the home network according to the home terminal device information, wherein the home gateway comprises at least one processor and a memory;
    wherein the cloud management platform comprises a channel cloud, a service cloud and a plurality of home sub-clouds;
    wherein each of the plurality of home sub-clouds is configured to store and manage the home terminal device information of the home network, the service cloud is configured to store and manage service applications of the home terminal device in the home network;
    wherein the channel cloud is used for storing and managing device information of the communication channel device, wherein the device information at least comprises state information, configuration information, topology information and route information of the communication channel device; and
    wherein the home terminal device information comprises: home terminal device state information, topology information, information about control/operation that a user performs to the home terminal device, and information about control/operation that a maintenance/user terminal performs to the home terminal device, wherein the home terminal device information is stored in the home sub-cloud.

* * * * *